US012669214B2

(12) United States Patent
Yang

(10) Patent No.: US 12,669,214 B2
(45) Date of Patent: Jun. 30, 2026

(54) VALVE HOLDER

(71) Applicant: Tsai-Chen Yang, Taichung City (TW)

(72) Inventor: Tsai-Chen Yang, Taichung City (TW)

( * ) Notice: Subject to any disclaimer, the term of this patent is extended or adjusted under 35 U.S.C. 154(b) by 280 days.

(21) Appl. No.: 18/522,892

(22) Filed: Nov. 29, 2023

(65) Prior Publication Data

US 2025/0172235 A1 May 29, 2025

(51) Int. Cl.
F16M 13/02 (2006.01)
F16L 3/13 (2006.01)

(52) U.S. Cl.
CPC .............. F16M 13/02 (2013.01); F16L 3/13 (2013.01)

(58) Field of Classification Search
CPC .................................... F16M 13/02; F16L 3/13
USPC ........... 248/74.2, 49, 65, 68.1, 74.1; 24/455; 174/68.1
See application file for complete search history.

(56) References Cited

U.S. PATENT DOCUMENTS 6,216,986 B1 * 4/2001 Kwilosz .................... F16L 3/13
248/74.1
6,641,093 B2 * 11/2003 Coudrais ............. B60R 16/0215
248/68.1

| | | | |
|---|---|---|---|
| 7,240,880 B2 * | 7/2007 | Benoit ..................... | F16L 3/223 |
| | | | 248/65 |
| 8,418,342 B2 * | 4/2013 | Dell .......................... | F16B 2/02 |
| | | | 29/447 |
| 10,723,291 B2 * | 7/2020 | Leancu .................. | F16L 3/223 |
| 10,927,980 B2 * | 2/2021 | Varale ........................ | F16L 3/13 |
| 11,047,511 B2 * | 6/2021 | Leo, Sr. .................. | F16L 3/237 |
| 2008/0217488 A1 * | 9/2008 | Carretero .................. | F16L 3/13 |
| | | | 248/65 |
| 2013/0146720 A1 * | 6/2013 | Meyers ................. | F16L 55/035 |
| | | | 248/68.1 |
| 2014/0223701 A1 * | 8/2014 | Bean .................... | A61B 1/0014 |
| | | | 24/483 |

* cited by examiner

*Primary Examiner* — Todd M Epps

(74) *Attorney, Agent, or Firm* — MUNCY, GEISSLER, OLDS & LOWE, P.C.

(57) ABSTRACT

A valve holder is provided, wherein the valve holder include: a base including a through hole; two arm members symmetrically extending from opposing sides of the base, each arm member including first, second and third arms, the first arm and the second arm being separate and connected to the base, the first arm and the second arm being integrally merged with each other and connected to the third arm, the base, the first arm and the second arm forming a room; and two clamping members, each clamping member including a main body connected to the third arm and projections, the main bodies of the two clamping members being arranged in interval and defining a clamping space configured for receiving a valve, the projections being disposed on the clamping member and projecting to be within the clamping space for engaging with the valve.

9 Claims, 5 Drawing Sheets

VALVE HOLDER

BACKGROUND OF THE INVENTION

Field of the Invention

The present invention relates to a valve holder.

Description of the Prior Art

A valve is used to control the flow of a fluid so that it can be used to control the action of the back-end mechanism or the condition of the output fluid, such as controlling the flow rate, conducting fluid diversion, mixing fluid or the like. Generally, the valves and pipes are disposed in the walls of a building, which is beautiful and can effectively fix and protect them.

However, depending on various materials of the fixtures to be installed or the construction methods, the valves and pipes might be exposed outside the wall, and the valves therefore have to be received in a recess additionally formed on the wall, which is complicated, time-consuming, and can easily affect the structural strength of the fixed object or cause damage to it. If it is not fixed, the valve will be easily impacted and moved by external forces, causing the pipe to fall off.

The present invention is, therefore, arisen to obviate or at least mitigate the above-mentioned disadvantages.

SUMMARY OF THE INVENTION

The main object of the present invention is to provide a valve holder which can stably hold a valve and is conducive to assembling of parts.

To achieve the above and other objects, a valve holder is provided, wherein the valve holder include: a base including a through hole extending in a first direction; two arm members symmetrically extending from opposing sides of the base, each of the two arm members including a first arm, a second arm and a third arm, an end of the first arm and an end of the second arm being separate in the first direction and connected to the base, another end of the first arm and another end of the second arm extending in the first direction and being integrally merged with each other and connected to the third arm, the base, the first arm and the second arm forming a room; and two clamping members, each of the two clamping members including a main body connected to the third arm and a plurality of projections, the main bodies of the two clamping members being arranged in interval in a direction perpendicular to the first direction and defining a clamping space configured for receiving a portion of a valve, the plurality of projections being disposed on the clamping member and projecting to be within the clamping space for engaging with the valve.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
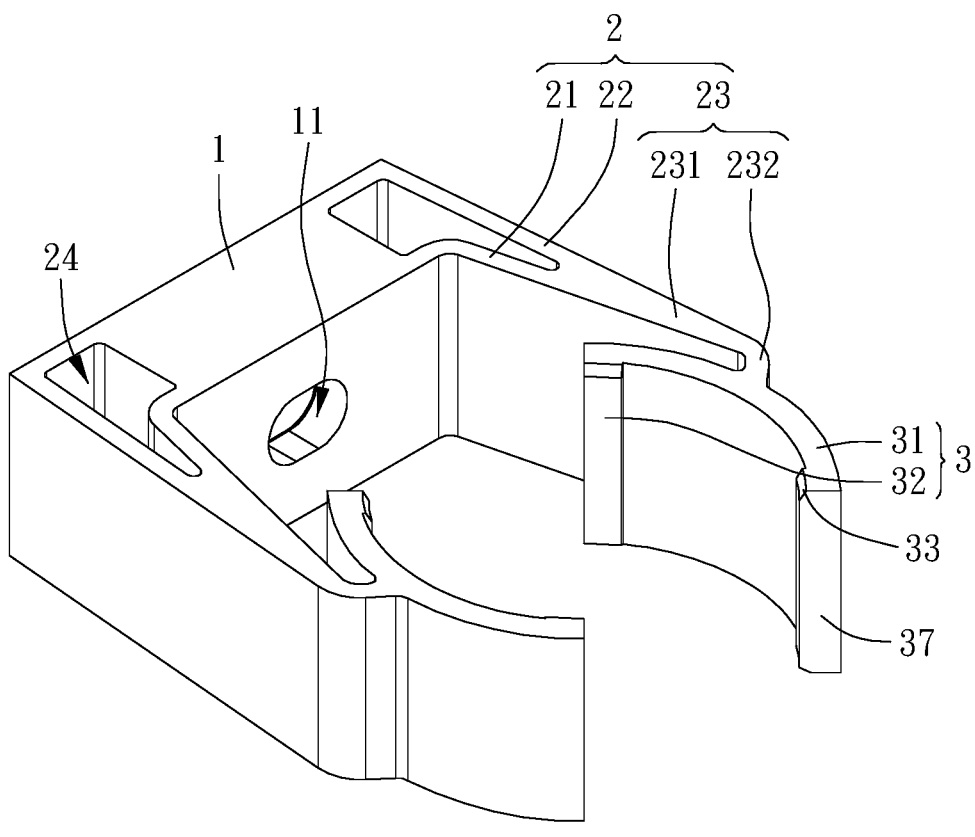
FIG. 1 is a stereogram of an exemplary embodiment of the present invention.
Figure 2:
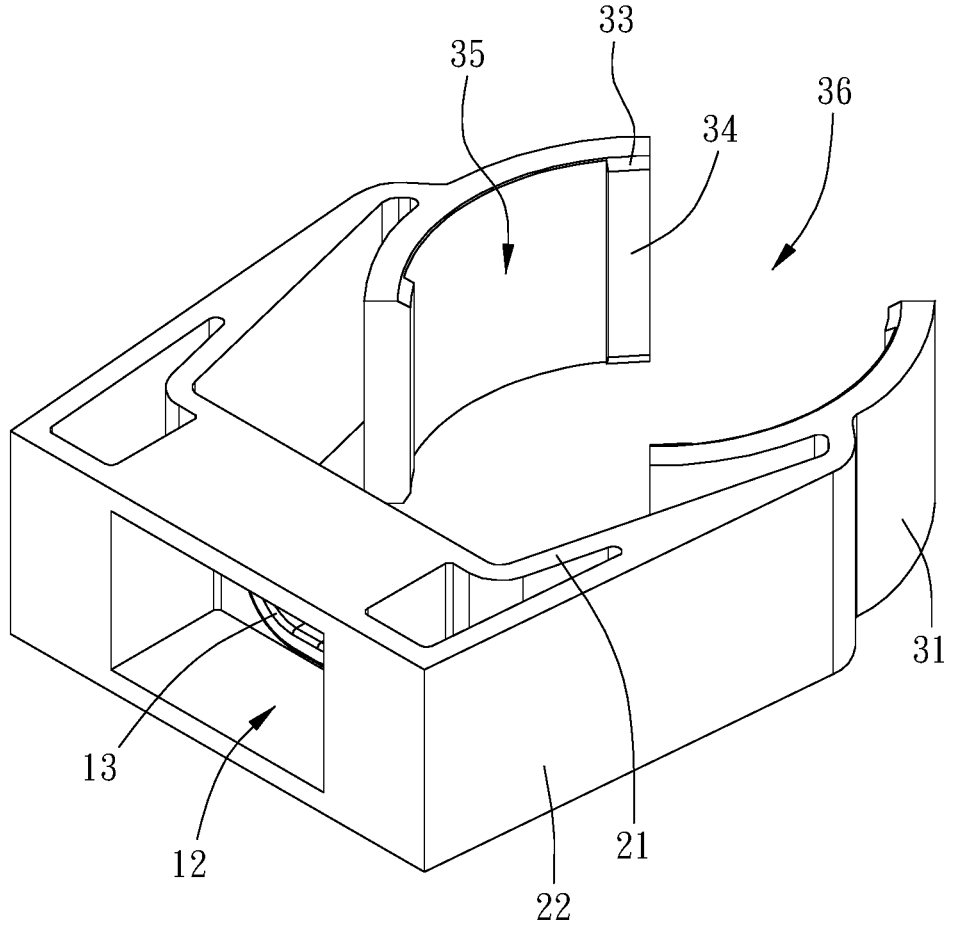
FIG. 2 is another stereogram of an exemplary embodiment of the present invention.
Figure 3:
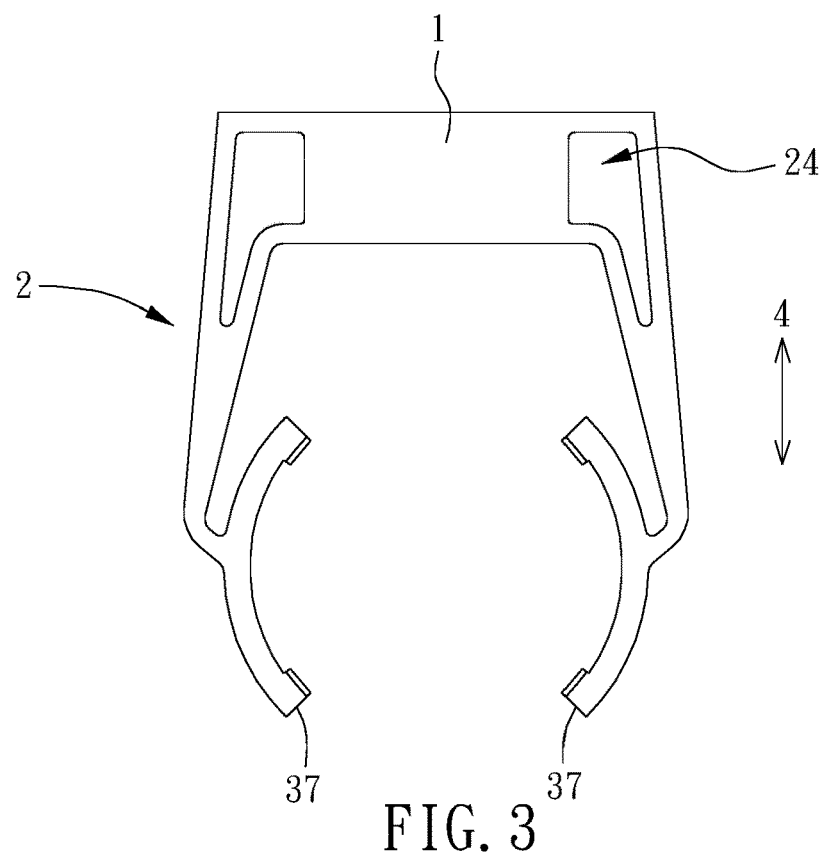
FIG. 3 is a top view of an exemplary embodiment of the present invention.
Figure 4:
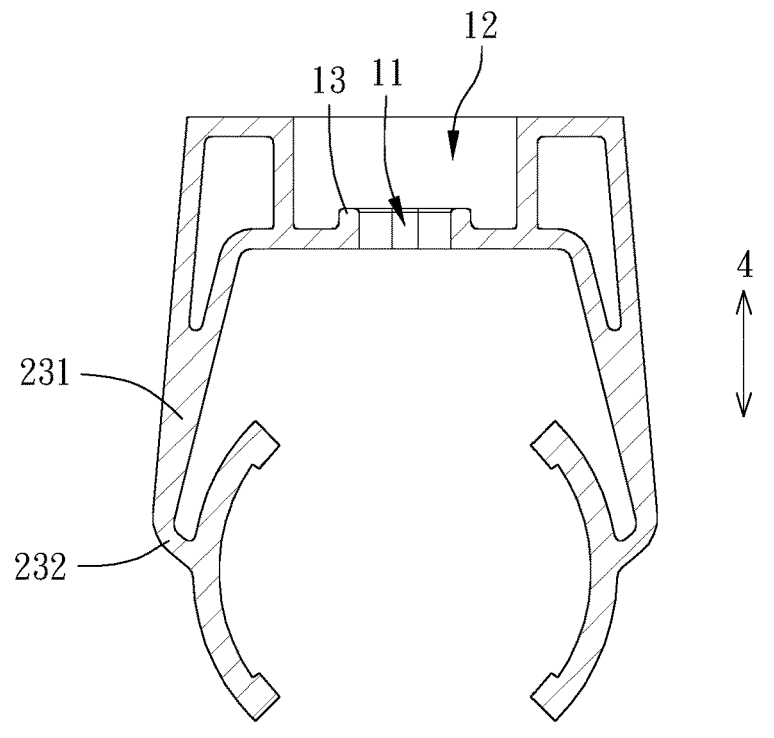
FIG. 4 is a cross-sectional view of an exemplary embodiment of the present invention.
Figure 5:
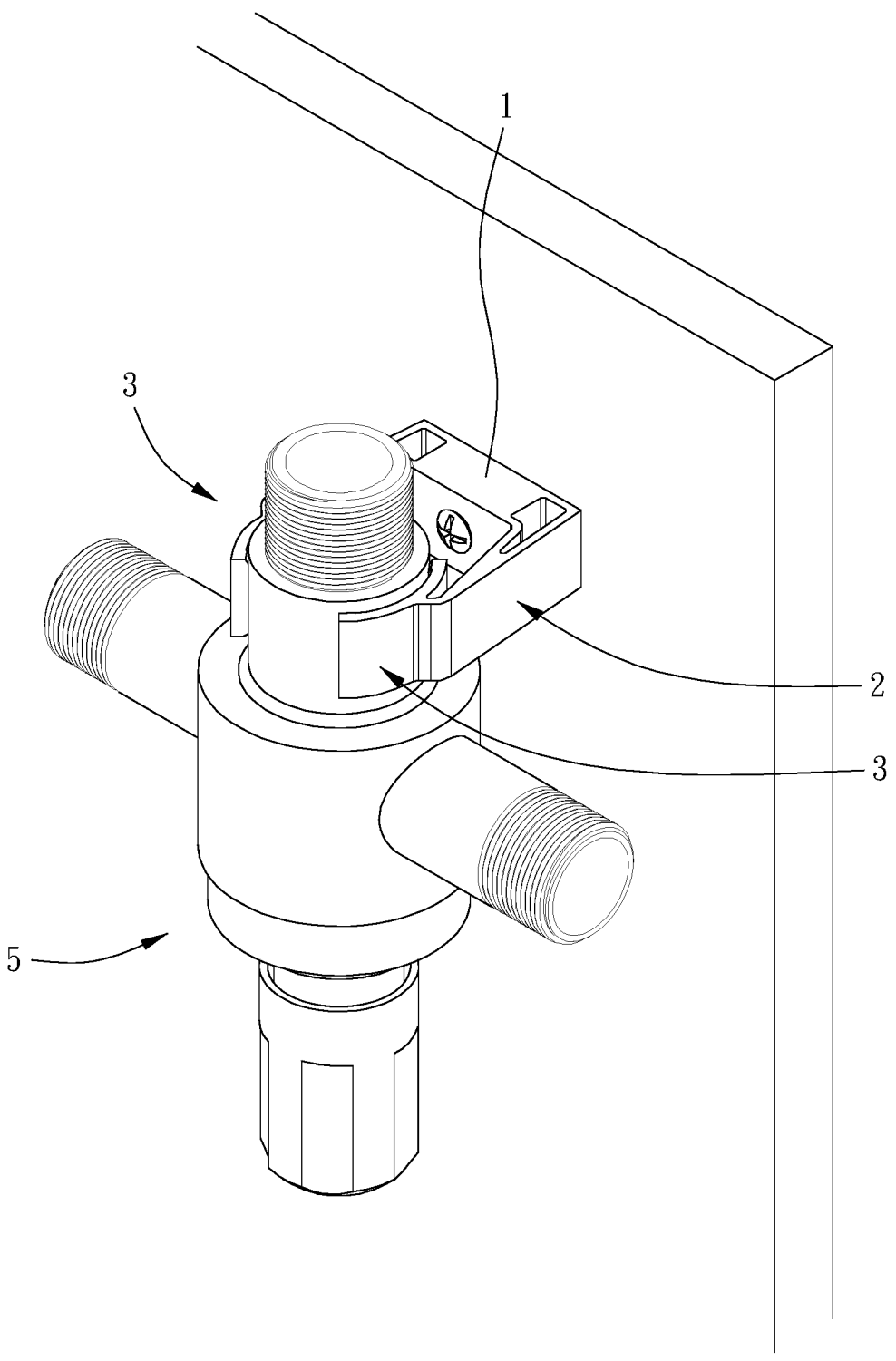
FIG. 5 is a drawing showing application of a valve holder according to an exemplary embodiment of the present invention.
Figure 6:
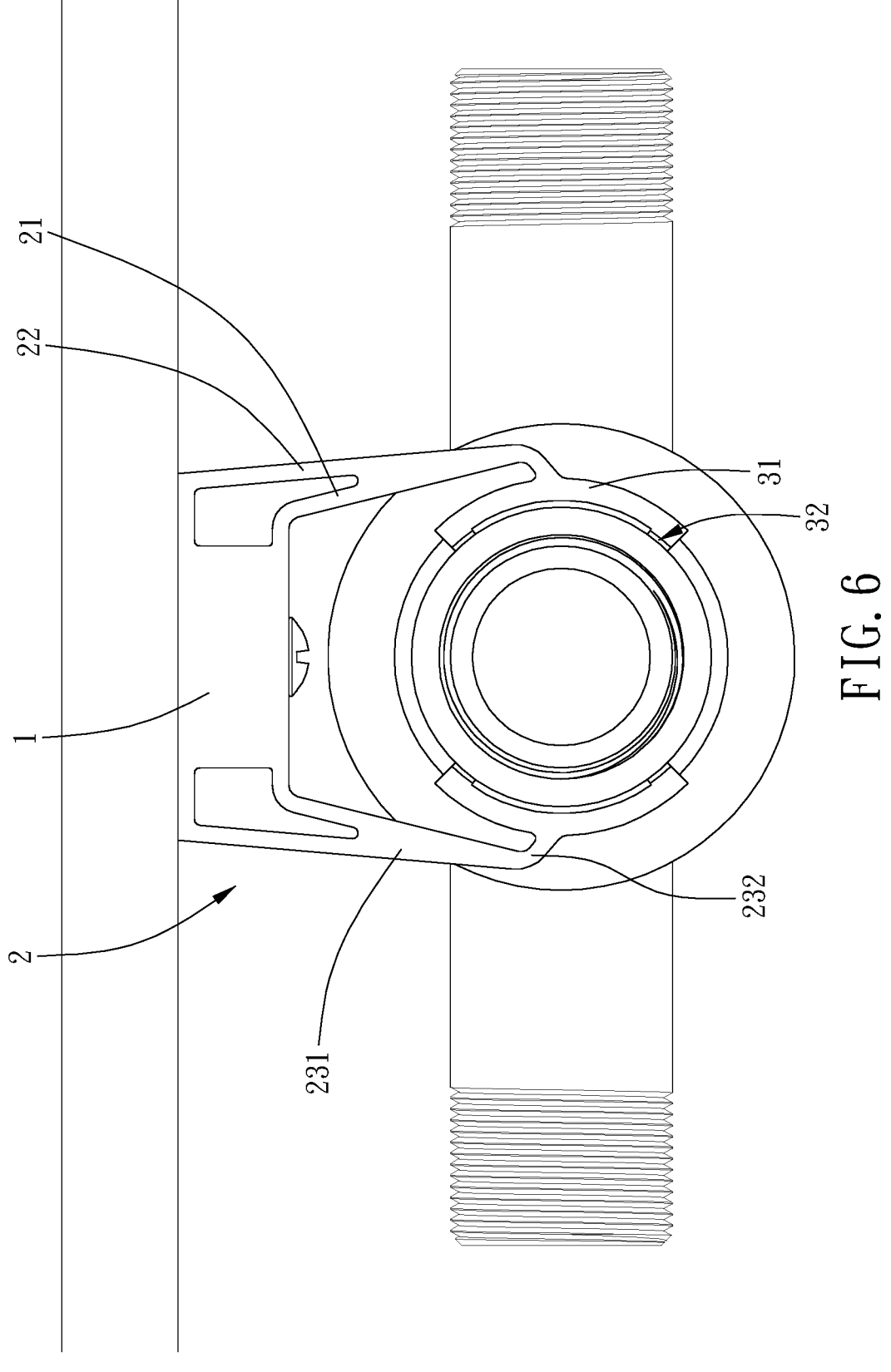
FIG. 6 is an enlarged top view of FIG. 5.

Please refer to FIGS. 1 to 6 for an exemplary embodiment of the present invention. A valve holder of the present invention includes a base 1, two arm members 2 and two clamping members 3.

Preferably, the base 1, the two arm members 2 and the two clamping members 3 are integrally formed of one piece, which has a continuous structure and has the same structural hardness performance at all regions, and it can be produced quickly without assembly. In this embodiment, the valve holder is made of plastic material, which is capable of rapid mass production through plastic injection.

The base 1 includes a through hole 11 extending in a first direction 4, which allows a fastener (such as a screw) to be disposed through the through hole 11 to stably position the base 1 on a fixed object (such as a wooden wall, cement wall). The base 1 further includes a recess 12, for reducing its weight; and the recess 12 is in communication with the through hole 11 for a screw to be disposed therethrough. In this embodiment, the recess 12 and the through hole 11 are coaxially arranged. The base 1 further includes an annular flange 13, and the annular flange 13 extends around the through hole 11 and is located within the recess 12. The annular flange 13 can increase the contact area of the screw to improve the combination strength and stability.

The two arm members 2 symmetrically extend from opposing sides of the base 1. Specifically, each of the two arm members 2 includes a first arm 21, a second arm 22 and a third arm 23, an end of the first arm 21 and an end of the second arm 22 are separate in the first direction 4 and connected to the base 1, another end of the first arm 21 and another end of the second arm 22 extend in the first direction 4 and is integrally merged with each other and connected to the third arm 23, and the base 1, the first arm 21 and the second arm 22 form a room 24. The room 24 allows the arm member 2 to have the ability of elastic deformation, which allows the two arm members 2 to be urged to resiliently move close to or away from each other.

Each of the two clamping members 3 includes a main body 31 connected to the third arm 23 and a plurality of projections 32, the main bodies 31 of the two clamping members 3 are arranged in interval in a direction perpendicular to the first direction 4 and define a clamping space 35 configured for receiving a portion of a valve 5, and the plurality of projections 32 are disposed on the clamping member 3 and project to be within the clamping space 35 for engaging with the valve 5. The plurality of projections 32 can concentrate the force to clamp the valve 5 so that the valve 5 can be stably restrained by the valve holder. In this embodiment, the third arm 23 is connected to a middle portion of the main body 31, and the main body 31 extends arcedly so that it can stably hold the valve 5.

Specifically, the main body 31 has two of the plurality of projections 32, one of the two of the plurality of projections 32 is flash with an end surface of the main body remote the base to form a first guide surface 37, and the first guide surface 37 is inclined to the first direction 4. The first guide surfaces 37 of the two clamping members 3 extend taperedly toward the base 1 in the first direction 4, and the first guide surfaces 37 of the two clamping members 3 define an opening 36. The opening 36 with a flared shape is convenient for receiving the valve 5 so that the valve 5 can smoothly slide against the first guide surface 37 and enter the clamping space 35 through the opening 36. In this embodiment, each of the plurality of projections 32 extends in the direction perpendicular to the first direction 4, which can provide a large contact area between the opening 36 and the valve 5, thereby effectively preventing the valve 5 from being disengaged.

Specifically, each of the plurality of projections 32 includes two second guide surfaces 33 disposed on opposing sides thereof, and a clamping surface 34 is configured for engaging with the valve 5. The first guide surfaces 37 of the two clamping members 3 are connected to and between the clamping surface 34 and the main body 31, and the two second guide surfaces 33 extend taperedly toward each other in the direction perpendicular to the first direction 4. In addition to the above-mentioned method in which the valve 5 laterally enters the clamping space 35 through the opening 36, the two clamping members 3 can also be axially sleeved onto the valve 5. The second guide surface 33 of each of the plurality of projections 32 can guide the valve 5 to smoothly enter the clamping space 35.

The third arm 23 includes a first section 231 and a second section 232, the first section 231 is connected to the first arm 21 and the second arm 22, the second section 232 is transversely connected to and between the first section 231 and the main body 31, and a portion of the main body 31 is gapped from the first section 231 so that it provides an enough margin space for receiving the main body 31. The second section 232 is inclined from the first section 231 and inclined relative to the first direction 4. When the valve 5 in the clamping space 35 urges the two arm members 2, the two clamping members 3 can effectively block the valve 5.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A valve holder including:
a base including a through hole extending in a first direction;
two arm members symmetrically extending from opposing sides of the base, each of the two arm members including a first arm, a second arm and a third arm, an end of the first arm and an end of the second arm being separate in the first direction and connected to the base, another end of the first arm and another end of the second arm extending in the first direction and being integrally merged with each other and connected to the third arm, the base, the first arm and the second arm forming a room; and
two clamping members, each of the two clamping members including a main body connected to the third arm and a plurality of projections, the main bodies of the two clamping members being arranged in interval in a direction perpendicular to the first direction and defining a clamping space configured for receiving a portion of a valve, the plurality of projections being disposed on the clamping member and projecting to be within the clamping space for engaging with the valve;
wherein the main body has two of the plurality of projections, one of the two of the plurality of projections is flash with an end surface of the main body remote the base to form a first guide surface, and the first guide surface is inclined to the first direction; the first guide surfaces of the two clamping members extend taperedly toward the base in the first direction, and the first guide surfaces of the two clamping members define an opening.

2. The valve holder of claim 1, wherein the base further includes a recess, and the recess is in communication with the through hole.

3. The valve holder of claim 2, wherein the base further includes an annular flange, and the annular flange extends around the through hole and is located within the recess.

4. The valve holder of claim 1, wherein each of the plurality of projections extends in the direction perpendicular to the first direction.

5. The valve holder of claim 1, wherein each of the plurality of projections includes two second guide surfaces disposed on opposing sides thereof, and a clamping surface, the clamping surface is configured for engaging with the valve, the first guide surfaces of the two clamping members are connected to and between the clamping surface and the main body, and the two second guide surfaces extend taperedly toward each other in the direction perpendicular to the first direction.

6. The valve holder of claim 1, wherein the third arm is connected to a middle portion of the main body.

7. The valve holder of claim 1, wherein the base, the two arm members and the two clamping members are integrally formed of one piece.

8. The valve holder of claim 1, wherein the third arm includes a first section and a second section, the first section is connected to the first arm and the second arm, the second section is transversely connected to and between the first section and the main body, and a portion of the main body is gapped from the first section.

9. The valve holder of claim 4, wherein the base further includes a recess, and the recess is in communication with the through hole; the base further includes an annular flange, and the annular flange extends around the through hole and is located within the recess; each of the plurality of projections includes two second guide surfaces disposed on opposing sides thereof, and a clamping surface, the clamping surface is configured for engaging with the valve, the first guide surfaces of the two clamping members are connected to and between the clamping surface and the main body, and the two second guide surfaces extend taperedly toward each other in the direction perpendicular to the first direction; the third arm is connected to a middle portion of the main body; the base, the two arm members and the two clamping members are integrally formed of one piece; the third arm includes a first section and a second section, the first section is connected to the first arm and the second arm, the second section is transversely connected to and between the first section and the main body, and a portion of the main body is gapped from the first section; the valve holder is made of plastic material; the main body extends arcedly; the recess and the through hole are coaxially arranged; the second section is inclined from the first section and inclined relative to the first direction.

* * * * *